US008703838B2

United States Patent
Webster et al.

(10) Patent No.: US 8,703,838 B2
(45) Date of Patent: Apr. 22, 2014

(54) UV-CURABLE LOW SURFACE ENERGY COATINGS

(75) Inventors: Dean C. Webster, Fargo, ND (US); Neena Ravindran, Fargo, ND (US); Ankit Vora, San Jose, CA (US)

(73) Assignee: NDSU Research Foundation, Fargo, ND (US)

( * ) Notice: Subject to any disclaimer, the term of this patent is extended or adjusted under 35 U.S.C. 154(b) by 499 days.

(21) Appl. No.: 12/867,901

(22) PCT Filed: Feb. 20, 2009

(86) PCT No.: PCT/US2009/034656
§ 371 (c)(1),
(2), (4) Date: Nov. 8, 2010

(87) PCT Pub. No.: WO2009/105625
PCT Pub. Date: Aug. 27, 2009

(65) Prior Publication Data
US 2011/0046257 A1  Feb. 24, 2011

Related U.S. Application Data

(60) Provisional application No. 61/030,485, filed on Feb. 21, 2008.

(51) Int. Cl.
B32B 17/10 (2006.01)
C03C 25/10 (2006.01)
C08G 77/04 (2006.01)
C08J 7/04 (2006.01)

(52) U.S. Cl.
USPC ............ 522/148; 522/107; 522/172; 528/26; 428/447; 427/515

(58) Field of Classification Search
USPC ................... 528/26; 522/107, 142, 148, 172; 427/515; 428/447
See application file for complete search history.

(56) References Cited

U.S. PATENT DOCUMENTS 4,064,286 A 12/1977 Hahn
4,201,808 A  5/1980 Cully et al.

(Continued)

OTHER PUBLICATIONS

Kokubo et al., "Studies on the Charge-Transfer Complex and Polymerization. XVII. The Reactivity of the Charge-Transfer Complex in Alternating Radical Copolymerization of Vinyl Ethers and Maleic Anhydride," Macromolecules 1(6):482-488 (1968).

(Continued)

*Primary Examiner* — Michael Pepitone
*Assistant Examiner* — Jessica Roswell
(74) *Attorney, Agent, or Firm* — J.A. Lindeman & Co., PLLC

(57) ABSTRACT

The invention provides an improved unsaturated polyester prepared from the polycondensation of unsaturated diacid monomers or unsaturated acid anhydride mononers and polyol monomers and, optionally, one or more saturated aliphatic or aromatic diacid monomers or anhydride monomers thereof. The improvement comprises 0.5 to 50 weight percent, based on the total monomer weight, of a hydroxyalkyl-functional siloxane of formula (1) below. The invention also relates to a UV curable coating formulation containing a siloxane-functional unsaturated polyester resin, a vinyl ether functional diluents and a photoinitiator. The invention further provides a method of preparing an article with a low-surface energy coating. According to the method, at least one surface of an article with a coating formulation of the invention; and the coating is then cured as described above with UV light to form a low-surface energy coating on the surface. The invention also relates to articles having a low-surface energy coating according to the invention.

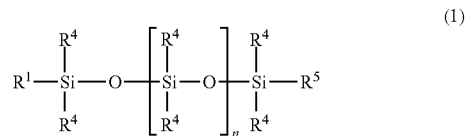

(1)

22 Claims, 10 Drawing Sheets

(56) References Cited

U.S. PATENT DOCUMENTS

| | | | |
|---|---|---|---|
| 4,278,574 A * | 7/1981 | Dworak et al. | 554/77 |
| 4,355,062 A * | 10/1982 | Wang et al. | 428/65.8 |
| 4,689,383 A * | 8/1987 | Riffle et al. | 528/12 |
| 5,194,473 A * | 3/1993 | Shinoda et al. | 524/263 |
| 5,527,578 A | 6/1996 | Mazurek et al. | |
| 5,536,760 A * | 7/1996 | Friedlander et al. | 522/96 |
| 2002/0086112 A1 * | 7/2002 | Chen et al. | 427/256 |
| 2007/0092644 A1 | 4/2007 | Soutar | |
| 2008/0153982 A1 * | 6/2008 | Lai et al. | 525/91 |

OTHER PUBLICATIONS

Marchessault et al., "Physical Properties of a Naturally Occurring Polyester: Poly(β-hydroxyvalerate)/Poly(β-hydroxybutyrate)," Macromolecules 17:1882-1884 (1984).

Prementine et al., "Model Copolymerization Reactions. Evidence against Concerted Complex Addition in Reactions of Simple Alkyl Radicals with N-Phenylmaleimide and Donor Olefins," Macromolecules 22:770-775 (1989).

Ragin, "Radiation-Curable Coatings with Emphasis on the Graphic Arts," Radiation Curing: Science and Technology, pp. 273-299 (1992).

Lapin et al., "Non-Acrylate Reactive Diluents and Oligomers for UV/EB Curing," RadTech Asian '93 UV/EB Conf. Expo., Conf. Proc., pp. 149-156 (1993).

Fouassier, "Photoinitiation, Photopolymerization, and Photocuring: Fundamentals and Applications" (1995).

Lapin et al., "Photoinduced Copolymerization of Unsaturated Ethers with Unsaturated Esters," Polymeric Materials Science and Engineering 72:589-590 (1995).

Ni et al., "Polyurea/polysiloxane creamer coatings," Progress in Organic Coatings 38:97-110 (2000).

Jang et al., "Synthesis and Cationic Photopolymerization of Epoxy-Functional Siloxane Monomers and Oligomers," J. Polymer Science: Part A: Polymer Chemistry 41:3056-3073 (2003).

Kurian et al., "Synthesis, permeability and biocompatibility of tricomponent membranes containing polyethylene glycol, polydimethylsiloxane and polypentamethylcyclopentasiloxane domains," Biomaterials 24:3493-3503 (2003).

Kayaman-Apohan et al., "Synthesis and characterization of UV-curable vinyl ether functionalized urethane oligomers," Progress in Organic Coatings 49:23-32 (2004).

Kim et al., "Photocuring of a Thiol-ene System Based on an Unsaturated Polyester," J. Applied Polymer Science 95:342-350 (2005).

Dworak et al., "Gas Permeability Analysis of Photo-Cured Cyclohexyl-Substituted Polysiloxane Films," J. Applied Polymer Science 102:2343-2351 (2006).

Ekin et al., "Synthesis and Characterization of Novel Hydroxyalkyl Carbamate and Dihydroxyalkyl Carbamate Terminated Poly(dimethylsiloxane) Oligomers and Their Block Copolymers with Poly (ϵ-caprolactone)," Macromolecules 39:8659-8668 (2006).

Ravindran et al., "Effect of Polymer Composition on Performance Properties of Maleate-Vinyl Ether Donor-Acceptor UV-Curable Systems," JCT Research 3(3):213-219 (2006).

Yang et al., "Preparation and Surface Properties of Silicone-Modified Polyester-Based Polyurethane Coats," JCT Research 3(4):333-339 (2006).

Chen et al., "Novel multifunctional hyperbranched polymeric photoinitiators with built-in amine coinitiators for UV curing," J. Mater. Chem. 17:3389-3392 (2007).

Chen et al., "Novel Multifunctional Polymeric Photoinitiators and Photo-Coinitiators Derived from Hyperbranched Polyglycerol," Macromol. Chem Phys. 208:1694-1706 (2007).

Crivello et al., "Synthesis of Novel Silicon-Containing Monomers for Photoinitiated Cationic Polymerization," Science and Technology of Silicones and Silicone-Modified Materials, pp. 27-36 (2007).

Dearman et al., "Comparative analysis of skin sensitization potency of acrylates (methyl acrylate, ethyl acrylate, butyl acrylate, and ethylhexyl acrylate) using the local lymph node assay," Contact Dermatitis 57:242-247 (2007).

Ekin et al., "Synthesis, formulation, and characterization of siloxane-polyurethane coatings for underwater marine applications using combinatorial high-throughput experimentation," J. Coat. Technol. Res. 4(4):435-451 (2007).

He et al., "UV-Curable Hybrid Coatings Based on Vinylfunctionalized Siloxane Oligomer and Acrylated Polyester," J. Applied Polymer Science 105:2376-2386 (2007).

Majumdar et al., "Thermoset Siloxane-Urethane Fouling Release Coatings," ACS Symposium Series, pp. 61-75 (2007).

Ferrero et al., "Water-Repellent Finishing of Cotton Fabrics by Ultraviolet Curing," J. Applied Polymer Science 107:810-818 (2008).

* cited by examiner

UV-CURABLE LOW SURFACE ENERGY COATINGS

CROSS REFERENCE TO RELATED APPLICATION

This application claims priority to U.S. provisional application No. 61/030,485, filed Feb. 21, 2008, which is incorporated herein by reference.

GOVERNMENT FUNDING

This invention was made with government support under EPS0447679 awarded by the National Science Foundation. The government has certain rights in the invention.

FIELD OF THE INVENTION

This invention relates to the synthesis of novel siloxane-functional unsaturated polyester resins and their UV curing to form coatings having low surface energy.

BACKGROUND OF THE INVENTION

Radiation-curable chemistry has been instrumental in achieving the industrial regulation goals of zero or low volatile organic content (VOC) coatings. UV-curable coatings have successfully replaced solvent-borne technologies for many applications like imaging, graphics, inks, electronic materials, adhesives and sealants, and coatings for surface modification. Since the coatings are cured by UV radiation, the crosslinking reactions take place at room temperature. This has allowed for wide use of UV-curable coatings on heat sensitive substrates like paper, wood and plastic. Most UV-curable formulations have low-viscosity while maintaining 100% solids, which is very difficult to achieve with the traditional solvent-borne or water-borne coatings.

The main components of a typical free-radical UV-curable system include a photoinitiator, an oligomer resin and a reactive diluent. Property-enhancing additives can also be included in the formulation depending on the coating requirements.

The most commonly used UV-curable technology is based on acrylate functional oligomer resins and diluents. A variety of acrylate-functional oligomer resins can be used including urethane-acrylate resins, epoxy-acrylate resins, polyether-acrylate resins, and polyester-acrylate resins. Acrylate functional diluents are low molecular weight compounds such as hexanedioldiacylate, trimethylolpropane triacylate, for example. In a donor-acceptor UV-curing system, an unsaturated polyester resin is the oligomer resin and the diluents can be vinyl ether functional compounds.

Two main methods for radiation curing are electron beam (EB) and ultraviolet (UV) radiation. For EB-curing, the initial step is ionization and excitation of the coating resins by high energy electrons [H. R. Ragin. "Radiation-curable coatings with emphasis on the graphic arts." *Radiation Curing* 1992, 273-299]. In case of UV-curing, the first step is the excitation of a photoinitiator or photosensitizer by absorption of photons of LTV-visible electromagnetic radiation. The EB system is different from UV-curable systems due to the absence of any photoinitiating or sensitizing moieties. In this work. LTV electromagnetic radiation has been used as the primary source for curing coatings.

Photoinitiators play a very important role in any successful UV-coating formulation. Since oligomers or reactive diluents do not produce initiating species with a sufficient quantum yield on light exposure, photoinitiators are required for initiating the polymerization [J.-P. Fouassier. *Photoinitiation, Photopolymerization and Photocuring Fundamentals and Applications*; Hanser Gardner: Munich Vienna New York, 1995]. Photoinitiators absorb the UV-radiation and get excited to an excited state, followed by photolysis into free radicals. The free radicals then attack the unsaturated functional groups present in the formulation (e.g., acrylate groups) to start the chain propagation step. For free radical photopolymerization the most commonly used photoinitiators are Norrish Type I (fragmentation process) or Norrish Type II (hydrogen abstraction) [Y. Chen; J. Loccufier; L. Vanmaele; E. Barriau; H. Frey. "Novel multifunctional polymeric photoinitiators and photo-coinitiators derived from hyperbranched polyglycerol." *Macromolecular Chemistry and Physics* 2007, 208, 1694-1706; Y. Chen; J. Loccufier; L Vanmaele; H. Frey. "Novel multifunctional hyperbranched polymeric photoinitiators with built-in amine coinitiators for UV curing." *Journal of Materials Chemistry* 2007b, 17, 3389-3392]. Norrish Type I reactions occur through fragmentation or α-cleavage process in which the radicals formed can directly initiate polymerization (Scheme 1).

Scheme 1. Mechanism for homolytic fragmentation type free-radical photoinitiator.

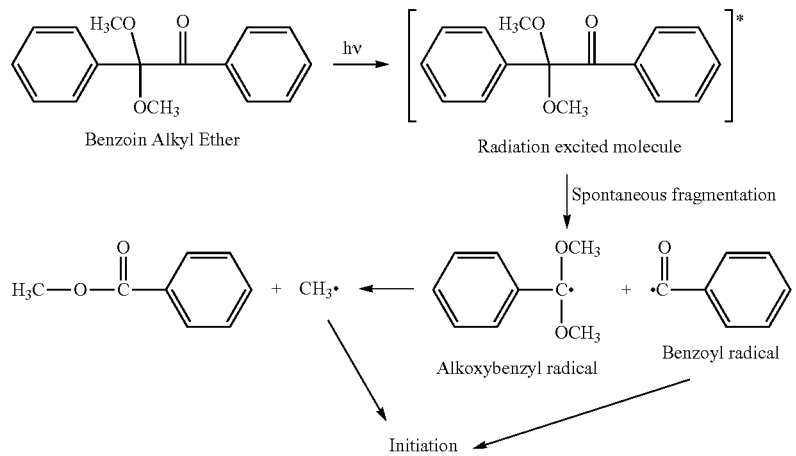

Scheme 1. Mechanism for Homolytic Fragmentation Type Free-Radical Photoinitiator.

In the Norrish Type II reaction, the free radicals are formed by hydrogen abstraction or electron extraction from a second compound that becomes the actual initiation free radical. This type of photoinitiator requires the presence of a synergist to enable electron transfer and hydrogen abstraction (tertiary amines, amides and ureas). The mechanism for Norrish Type II photoinitiator is outlined in Scheme 2.

Scheme 2. Mechanism for hydrogen abstraction free-radical photoinitiator.

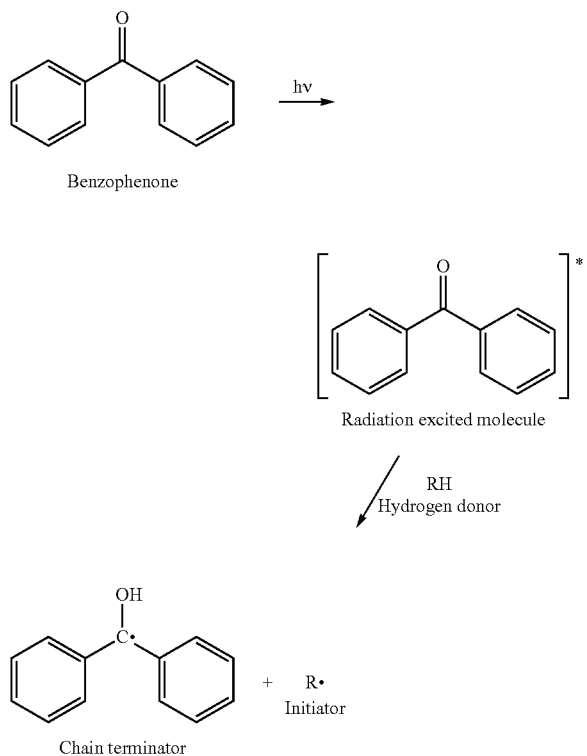

Scheme 2. Mechanism for Hydrogen Abstraction Free-Radical Photoinitiator.

Commonly used chemical systems in free-radical radiation curing technology are acrylates, thiol-ene, donor-acceptor systems based on unsaturated polyesters. The present invention relates to donor-acceptor chemistry based on siliconized unsaturated polyester (SUPE)-vinyl ether system.

The use of unsaturated polyesters (UPE) for radiation curing are known [Y. B. Kim; H. K. Kim; H. C. Choi; J. W. Hong. "Photocuring of a thiol-ene system based on an unsaturated polyester." *Journal of Applied Polymer Science* 2005, 95, 342-350]. Styrene is often used as a reactive diluent along with a photoinitiator for UPE based radiation-curable systems. For unsaturated polyesters, diacids and diacid anhydrides such as fumaric acid, maleic acid or maleic anhydride are commonly used to incorporate unsaturated moieties in the polyester backbone. When unsaturated polyester having electron deficient moieties is used in combination with vinyl ether having an excess electron charge as a crosslinking mechanism for coating, a donor-acceptor complex is formed. Scheme 3 depicts the most commonly selected donor-acceptor pairs for UV-curable coatings.

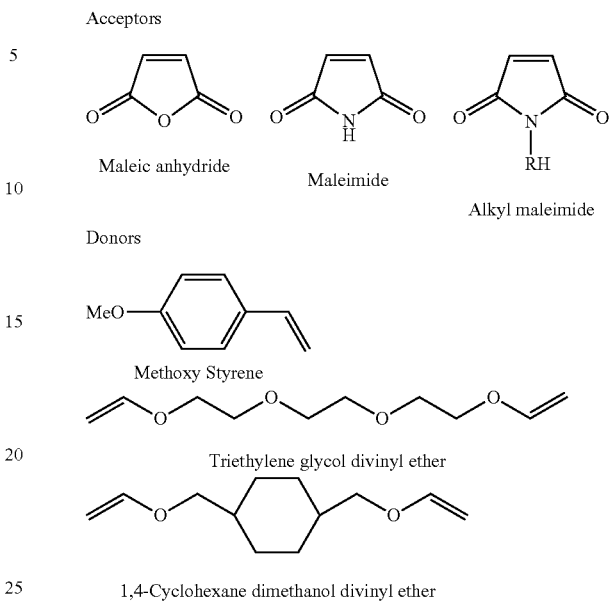

Donor-acceptor polymerization is a type of chain growth polymerization of the vinyl groups initiated by free radicals. The maleate-vinyl ether system is the most common donor-acceptor system, wherein vinyl ether is the donor and maleate ester is the acceptor N. Ravindran; A. Vora; D. C. Webster. "Effect of polymer composition on performance properties of maleate-vinyl ether donor-acceptor UV-curable systems."*JCT Research* 2006, 3, 213-219]. One of the main advantages of using donor-acceptor UV-curable chemistry is the absence of acrylates, which are known skin sensitizers [R. J. Dearman; C. J. Betts; C. Farr; J. McLaughlin; N. Berdasco; K. Wiench; K. Kimber. "Comparative analysis of skin sensitization potency of acrylates (methyl acrylate, ethyl acrylate, butyl acrylate and ethylhexyl acrylate) using the local lymph node assay." *Contact Dermatitis* 2007, 57, 242-247].

Several studies in the area of maleate-vinyl ether chemistry have been previously reported [S. C. Lapin; G. K. Noren; J. M. Julian. "Photoinduced copolymerization of unsaturated ethers with unsaturated esters." *Polymeric Materials Science and Engineering* 1995, 72, 589-590; S. C. Lapin; G. K. Noren; J. J. Schouten. "Non-acrylate reactive diluents and oligomers for UV/EB curing." *RadTech Asia '93 UV/EB Conf. Expo., Conf. Proc.* 1993, 149-156; R. H. Marchessault; H. Morikawa; J. F. Revol; T. L. Bluhm. "Physical properties of a naturally occurring polyester: poly(b-hydroxyvalerate) 'poly(b-hydroxybutyrate)."*Macromolecules* 1984, 17, 1882-1884]. Lapin et al. studied the properties of oligomers with different backbones and reactive diluents with varying functionalities to formulate UV-curable coatings [S. C. Lapin; G. K. Noren; J. J. Schouten. "Non-acrylate reactive diluents and oligomers for UV/EB curing." *RadTech Asia '93 UV/EB Conf. Expo., Conf. Proc.* 1993, 149-156]. Significant work has also been reported on the mechanistic and stereochemical aspects of donor-acceptor chemistry [T. Kokubo; S. Iwatsuki; Y. Tamashita. "Studies on the Charge-Transfer Complex and Polymerization. XVII. The Reactivity of the Charge-Transfer Complex in Alternating Radical Copolymerization of Vinyl Ethers and Maleic Anhydride." *Macromolecules* 1968, 1, 482-488; G. S. Prementine; S. A. Jones; D. A. Tirrell. "Model copolymerization reactions. Evidence against concerted complex addition in reactions of simple alkyl radicals with N-phenylmaleimide and donor olefins." *Macromolecules* 1989, 22, 770-775].

The incorporation of polydimethylsiloxane (PDMS) segments into polymers and coatings resins is well-studied [D. P. Dworak; H. Lin; B. D. Freeman; M. D. Soucek. "Gas permeability analysis of photo-cured cyclohexyl-substituted polysiloxane films." *Journal of Applied Polymer Science* 2006, 102, 2343-2351; H. Ni; W. J. Simonsick; A. D. Skaja; J. P. Williams; M. D. Soucek. "Polyurea/polysiloxane ceramer coatings." *Progress in Organic Coatings* 2000, 38, 97-110].

Functional PDMS block copolymers have been previously synthesized to formulate crosslinked hydrophobic coatings [A. Ekin; D. C. Webster. "Synthesis and Characterization of Novel Hydroxyalkyl Carbamate and Dihydroxyalkyl Carbamate Terminated Poly(dimethylsiloxane) Oligomers and Their Block Copolymers with Poly(ε-caprolactone)." *Macromolecules* 2006, 39, 8659-8668; A. Ekin; D. C. Webster; J. W. Daniels; S. J. Stafslien; F. Casse; J. A. Callow; M. E. Callow. "Synthesis, formulation, and characterization of siloxane-polyurethane coatings for underwater marine applications using combinatorial high-throughput experimentation." *Journal of Coatings Technology and Research* 2007, 4, 435-451; P. Majumdar; A. Ekin; D. C. Webster. "Thermoset siloxane-urethane fouling release coatings," *ACS Symposium Series* 2007, 957, 61-75]. Due to the low surface energy of PDMS, small amounts of PDMS incorporated into the coating system can provide a hydrophobic surface to the coating.

UV-curable siloxane polymers have also been synthesized for various applications [F. Ferrero; M. Periolatto; M. Sangermano; M. B. Songia. "Water-repellent finishing of cotton fabrics by ultraviolet curing." *Journal of Applied Polymer Science* 2008, 107, 810-818; J. He; L. Zhou; M. D. Soucek; K. M. Wollyung; C. Wesdemiotis. "UV-curable hybrid coatings based on vinyl-functionalized siloxane oligomer and acrylated polyester." *Journal of Applied Polymer Science* 2007, 105, 2376-2386].

Crivello et al. have synthesized a series of cycloaliphatic and oxetane functional PDMS macromonomers for cationic UV-curing. J. V. Crivello; NI. Jang. "Synthesis of novel silicon-containing monomers for photoinitiated cationic polymerization." *ACS Symposium Series* 2007, 964, 27-36; M. Jang; J. V. Crivello. "Synthesis and cationic photopolymerization of epoxy-functional siloxane monomers and oligomers." *Journal of Polymer Science, Part A: Polymer Chemistry* 2003, 41, 3056-3073.

Silanol terminated PDMS has been attached to hydroxyl functional polyesters previously. See J. Yang; S. Zhou; B. You; L. Wu. "Preparation and surface properties of silicone-modified polyester-based polyurethane coats." *JCT Research* 2006, 3, 333-339. These polyesters have been used for synthesis of segmented polyurethanes with the polyester being the soft segment. However, it is well known that the hydrolytic stability of silyl ether bonds formed from the reaction of a silanol-terminated PDMS and alcohols is poor.

Even with the development of resins having siloxane functionality, there is a need for solvent-free energy curable coatings having low surface energy which do not contain acrylates. These types of low surface energy coatings can be used for applications such as release paper, anti-graffiti coatings, and non-fouling coatings. This invention answers that need.

SUMMARY OF THE INVENTION

The invention relates to the synthesis of siloxane-functional unsaturated polyester resins, blending the resins with vinyl ethers and a photoinitiator to make a coating formulation, and curing the formulation on a surface to form a coating that has low surface energy. The siloxane oligomers used to modify the unsaturated polyesters are terminated with a single hydroxyl alkyl group, two hydroxyl alkyl groups on one chain end, or hydroxyl alkyl groups on both chain ends.

In one embodiment, the invention provides an improved unsaturated polyester prepared from the polycondensation of unsaturated diacid monomers or unsaturated diacid anhydride monomers and polyol monomers and, optionally, one or more saturated aliphatic or aromatic diacid monomers or anhydride monomers thereof, the improvement comprises 0.5 to 50 weight percent, based on the total monomer weight, of a hydroxyalkl-functional siloxane of formula (1) below.

In another embodiment, the invention relates to a UV-curable coating formulation containing a siloxane-functional unsaturated polyester resin of the invention, a vinyl ether functional diluent and a photoinitiator.

The invention also relates to a method of preparing an article with a low-surface energy coating. According to the method, at least one surface of an article is coated with a coating formulation of the invention; and the coating is then cured as described above with UV light to form a low-surface energy coating on the surface.

The invention also relates to articles having a low-surface energy coating according to the invention.

DETAILED DESCRIPTION OF THE INVENTION

This invention relates to the synthesis of siloxane-functional unsaturated polyester resins, the incorporation of these resins into a coating formulation and curing the formulations using UV light to form a hard surface coating.

Figure 1:
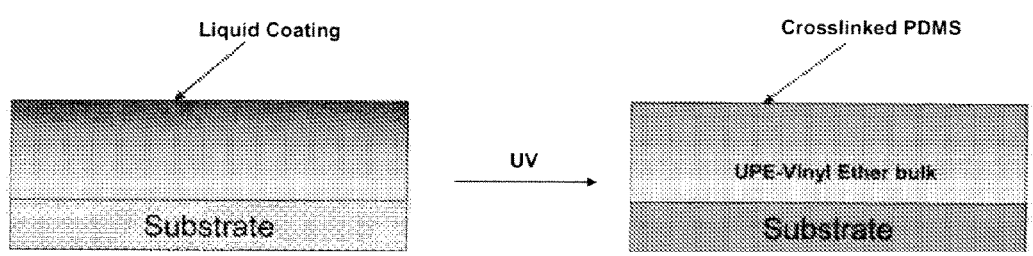
FIG. 1 depicts the UV-curing of PDMS-functional coating using donor-acceptor chemistry.

The focus of this work is on the synthesis of siloxane-functional unsaturated polyesters using unsaturated diacid monomers or unsaturated diacid anhydrides, (such as maleic anhydride) as the acceptor group and the use of vinyl ethers for the formulation of novel UV-curable coatings using the donor-acceptor mechanism. The UV-curable coatings formulated using the siloxane-functional unsaturated polyesters have low surface energy since the siloxane moieties (e.g. PDMS) tends to predominate on the surface of the coating, whereas the bulk of the coating would comprise the tough unsaturated polyester-vinyl ether crosslinked network. Due to the stratification of the PDMS to the surface of this coating the surface has the surface energy (low modulus) of the PDMS while the bulk properties are dominated by the UPE network, which has a significantly higher modulus than PDMS. This provides low-surface energy coatings using a novel UV-curable approach as shown in FIG. 1. The curable coating formulation is solvent and water free. The curable coatings are also acrylate-free, eliminating the health hazards associated with acrylates. The coatings may be applied to a variety of substrates including, but not limited to, paper, wood, plastic, metal, glass, and ceramic. The coatings are useful in applications where low surface energy is desired such as for marine ship hull coatings, anti-graffiti coatings, release coatings, and biocompatible coatings.

The siloxane-functional unsaturated polyester resins of the invention are synthesized by the polycondensation of a hydroxyalkyl functional siloxane, an unsaturated acid or anhydride, and one or more additional polyols. Various polycondensation methods known in the art may be used. Melt polycondensation methods are preferred. The resins are synthesized by mixing the ingredients in a reactor and processing at a temperature in the range of 160 to 250° C., preferably 190 to 210° C. Water of esterification is collected and the resin is processed until the desired acid number is reached. Acid numbers in the range of 0 to 35 are acceptable. The molar ratio of hydroxyl-functional species and acid bearing species are adjusted to yield a molecular weight in the range of 500 to 50,000 daltons, preferably 500 to 5000 daltons.

The hydroxyalkyl functional siloxane used in the siloxane-functional unsaturated polyester may have a hydroxyalkyl group at one chain end, two hydroxyalkyl groups at one chain end, or be alpha, omega terminated with hydroxyalkyl groups. The hydroxyalkyl functional siloxane can have a number average molecular weight in the range of 500 to 100,000 daltons, preferably 1000 to 50,000 daltons. Preferred hydroxyalkyl functional siloxanes are represented by formula (1).

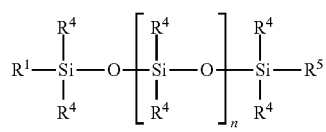

In formula (1), $R^1$ is the group $R^2C(R^3)_2CH_2O(CH_2)_m-$ where $R^2$ is OH, $CH_3$, or $CH_2CH_3$ and $R^3$ is H or $CH_2OH$, provided that at least one of $R^2$ and $R^3$ contains a hydroxyl (OH) moiety; and m ranges from 0 to 4. $R^4$ is a $C_1$-$C_3$ alkyl and preferably methyl. $R^5$ is $R^1$ or a $C_1$-$C_5$ alkyl and preferably n-butyl. The number of repeating siloxane groups in the hydroxyalkyl functional siloxane is defined by "n", which may range from 0 to 700, preferably from about 6 to about 150, and more preferably from about 6 to about 50. The alkyl chains in formula (1) may be straight or branched chains, with straight chains being preferred. The hydroxyalkyl functional siloxanes may be prepared according to procedures known in the art or purchased from suppliers. Specific examples of hydroxyalkyl functional siloxanes, with preferred substituents from formula (1), are shown below. An example of a monofunctional siloxane is MCR-C12, (reported molecular weight approximately 1000/mole), available from Gelest, Inc., Morrisville, Pa. An example of a siloxane having two hydroxyalkyl groups at one chain end is MCR-C61, (reported molecular weight approximately 1000 g/mole), available from Gelest, Inc, Morrisville, Pa. An example of a siloxane having hydroxyalkyl groups at both chain ends is DMS-C15, (reported molecular weight approximately 1000 g/mole), available from Gelest, Inc. Morrisville, Pa. Structures of these hydroxyalkyl functional siloxanes are shown below.

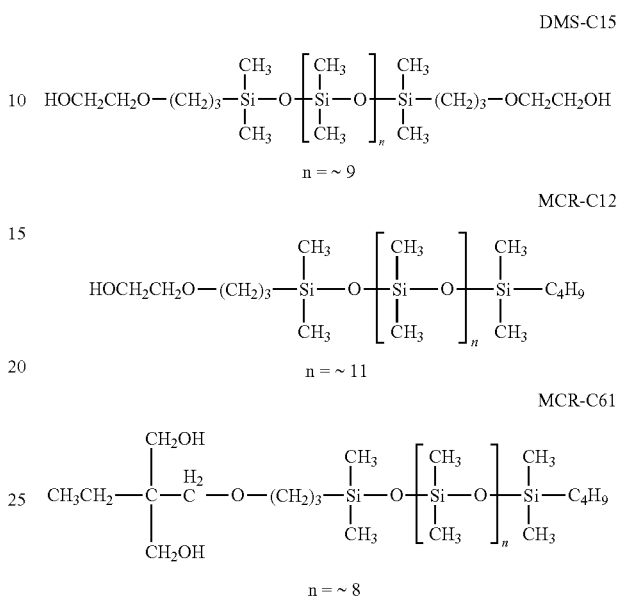

The amount of hydroxyalkyl functional siloxane in the unsaturated polyester should be sufficient to provide the desired low surface energy. The hydroxyalkyl functional siloxane may be incorporated into the unsaturated polyester at a range of 0.1 weight percent to 50 weight percent, preferably 0.5 to 5 weight percent.

Unsaturated diacids or their anhydrides used in the art to prepare unsaturated polyesters may be used in the siloxane-functional unsaturated polyester resins of the invention. Preferred unsaturated acids or anhydrides used in a polyester resin of the invention include maleic anhydride, maleic acid, fumaric acid, or itaconic acid.

Saturated diacids or their anhydrides can also be used in the synthesis of the unsaturated polyester, as is known in the art. Exemplary saturated diacids or their anhydrides include, but are not limited to, adipic acid, azelaic acid, phthalic anhydride, phthalic acid, isophthalic acid, terephthalic acid, hexahydrophtalic anhydride, tetrahydrophthalic anhydride, 1,4-cyclohexane dicarboxylic acid, 1,3-cyclohexane dicarboxylic acid, and the like.

In addition to the hydroxyalkyl functional polysiloxanes, the siloxane-functional polyester resins of the invention generally contain other polyols know in the polyester resin art. Typical polyols which may be used in the unsaturated polyester resin and can be difunctional, trifunctional, or tetrafunctional polyols. Exemplary difunctional polyols include, but are not limited to, ethylene glycol, 1,2-propanediol, 1,3-propanediol, 2-methyl-1,3-propanediol, 2,2,-dimethyl-1,3-propanediol (neopentyl glycol), 1,4-butanediol, 1,5-pentanediol, 1,6-hexanediol, 2,2,4-trimethyl-1,3-pentanediol, 2-butyl,2-ethyl-1,3-propanediol, diethylene glycol, triethylene glycol, dipropylene glycol, 1,4-cyclohexanedimethanol, 1,3-cyclohexanedimethanol, and the like. Hexanediol and diethylene glycol are preferred difunctional polyols. Polyols having greater than two hydroxy groups per molecule can be used to impart branching into the polyester structure, however need to be used sparingly in order to preclude gelation or excessively high viscosity. Suitable trifunctional polyols include glycerol, trimethylolpropane, trimethylol ethane, and the like. Exemplary tetrafunctional polyols include pentaerythritol, di-trimethylolpropane, and the like. Trimethylolpropane is a preferred polyol having greater than two hydroxyl groups.

In another embodiment, the invention relates to a UV curable coating formulation containing a siloxane-functional unsaturated polyester resin of the invention, a vinyl ether functional diluent and a photoinitiator.

To prepare a coating formulation of the invention, the siloxane-functional unsaturated polyester resins are mixed with vinyl ether monomers. The mixture is prepared such that the stoichiometric ratio between the vinyl groups in the vinyl ether functional diluents and the unsaturated groups on the unsaturated polyester is not more than 1:1; preferably the stoichiometric ratio of unsaturated groups in the polyester to vinyl ether ups is maintained at 1:1. The mixture may be prepared by mixing the siloxane-functional unsaturated polyester and the vinyl ether monomers together using standard mixing processes until a homogeneous mixture is obtained.

Vinyl ether monomers known in the art may be used in the inventive coating formulation of the invention. Vinyl ether monomers which may be used are monofunctional, difunctional, or trifunctional. Difunctional vinyl ethers are preferred. Examples of monofunctional vinyl ethers include, but are not limited, ethyl vinyl ether, butyl vinyl ether, hexyl vinyl ether, 2-ethylhexyl vinyl ether, and the like. Exemplary difunctional vinyl ethers include, but are not limited to, ethylene glycol divinyl ether, propanediol divinyl ether, butanediol divinyl ether, diethylene glycol divinyl ether, triethylene glycol divinyl ether, 1,4-cyclohexanedimethanol divinyl ether, and the like. Butanediol divinyl ether and triethylene glycol divinyl ether are preferred. In addition, vinyl ether functional oligomers such as the Vectomer resins produced by Morflex, Inc., Greensboro, N.C., can also be used in the coating formulations of the invention.

In addition, a coating formulation of the invention may be prepared containing the siloxane-functional unsaturated polyester blended with another non-siloxane-containing unsaturated polyester resin along with the vinyl ether functional diluent. The non-siloxane-containing unsaturated polyester resin can be synthesized as described above but without including the hydroxyalkyl functional siloxane.

A coating formulation of the invention also contains a photoinitiator. The photoinitiator interacts with UV light to generate free radicals which initiate the polymerization reaction of the unsaturated polyester with the vinyl ether groups. The photoinitiator is used in the amount of 0.1 weight percent to 10 weight percent, preferably 1 to 5 weight percent. Suitable photoinitiators include Norrish I type photoinitiators (also known as cleavage photoinitiators) or Norrish type II photoinitiators known in the art. Examples of Norrish type I photoinitiators are 2-hydroxy-2-methyl-1-phenyl-1-propanone, 2,2-diethoxyacetophenone, benzildimethylketal, 1-hydroxycyclohexylphenyl-ketone, 2,2'dimethoxy-2-phenylacetophenone and the like. Examples of Norrish type II photoinitiators are benzophenone, benzio, xanthone, thioxanthone, and the like, combined with synergists such as triethanolamine, triethylamine, dimethylethanol amine, and the like. Preferred is 2-hydroxy-2-methyl-1-phenyl-1-propanone.

A coating formulation of the invention may contain pigments and one or more additives or fillers known in the art for use in UV-curable polyester coatings. Such additives or fillers include, but are not limited to, extenders; pigment wetting and dispersing agents and surfactants; anti-settling, anti-sag and bodying agents; anti-flooding and anti-floating agents; fungicides and mildewcides; corrosion inhibitors; thickening agents; or plasticizers. Specific examples of such additives can be found in Raw Materials Index, published by the National Paint & Coatings Association, 1500 Rhode Island Avenue, NW, Washington, D.C. 20005.

The invention also relates to a method of preparing an article with a low-surface energy coating. According to the method, at least one surface of an article is coated with a coating formulation of the invention; and the coating is then cured as described above with UV light to form a low-surface energy coating on the surface. Coating the surface may be done by means known in the art such as, but not limited to, brushing, spraying, dipping, wire-coating, and the like. There is no limitation on the type of article which may be coated using the method of the invention. As mentioned above typical surfaces include, but are not limited to a paper surface, a wood surface, a plastic surface, a metal surface, a glass surface, and a ceramic surface.

The invention also relates to articles having a low-surface energy coating according to the invention. The article has at least one UV-cured layer of the coating formulation of the invention on at least one surface of the article. The article may be prepared by the method described above.

EXAMPLES

In the examples below, maleic anhydride (MA), 1,6 hexanediol (HD) and diethylene glycol (DEG) were obtained from Sigma-Aldrich, St. Louis, Mo. 1,4-cyclohexanedicarboxylic acid (1,4-CHDA) was obtained from Eastman Chemical Company, Kingsport, Tenn. Hydroxyalkyl-functional PDMS, MCR-C12, MCR-C61 and DMS-C15, all $M_w=1000$, were purchased from Gelest, Inc., Morristown, Pa. Triethyleneglycol divinyl ether (TEGDVE) and butanediol divinyl ether (BDDVE) were provided by BASF, Ludwigshafen, Germany. Vectomer 4010 and Vectomer 1312 vinyl ethers were obtained from Morflex, Inc., Greensboro, N.C. The photoinitiator, 2-hydroxy-2-methyl-1-phenyl-1-propanone (Darocur 1173) was supplied by Ciba Specialty Chemicals, Basel, Switzerland. All chemicals were used as received without further purification. In the examples below, all percentages relating to the amount of a component are percent by weight.

Example 1

Synthesis of Unsaturated Polyesters

Polyesters with hydrophobic PDMS chains attached to the backbone were synthesized. This was achieved by using three different hydroxyalkyl functional siloxane compounds. The hydroxyalkykl functional siloxane compounds used were—MCR-C61-dihydroxy terminated with PDMS as a pendant, MCR-C12 monohydroxy functional PDMS and DMS-C15 which is a telechelic hydroxy functional PDMS. The materials were incorporated into the polyester composition at different levels. The PDMS functional polyesters synthesized in this work are compiled in Table 1. The PDMS functionalized polyesters are denoted as follows: Control—UPE; Monofunctional—MUPE-1 where the number denotes the % of PDMS Difunctional—DUPE; and Pendant as RIPE

TABLE 1

Amount of functionalized PDMS in polyester backbone

| % of PDMS | MUPE | DUPE | PUPE |
|---|---|---|---|
| 1 | X |  | X |
| 2 | X | X | X |
| 5 | X |  | X |

The unsaturated polyester control was prepared using melt polyesterification. DEG (0.142 mol), 1,6 HD (0.107 mol), 1,4-CHDA (0.030 mol) and MA (0.174 mol) were weighed into a 250 ml, three-necked flask, equipped with a heating mantle, mechanical stirrer, temperature controller, condenser and a nitrogen inlet. A nitrogen blanket was maintained in the reaction flask during the course of the reaction in order to preclude side reactions such as oxidation of double bonds. The reaction mixture was heated to 180° C. and maintained at that temperature. Reaction was continued until the desired acid value was reached. Acid value was determined by titration with alcoholic KOH.

To synthesize the siloxane-functional unsaturated polyesters, the same reaction conditions as above were maintained, except that the required quantities of hydroxyalkyl-functionalized PDMS oligomers were added to the reaction flask one hour after the start of the reaction. The resulting polyesters were washed thrice with 200 ml of hexane to remove any unreacted PDMS and were dried in vacuo. Table 2 provides the compositions of the siloxane-functional unsaturated polyesters synthesized.

TABLE 2

Polyester resin compositions synthesized

| Polyester Name | 1,6 HD (g) | 1,4 CHDA (g) | DEG (g) | MA (g) | MCR-C12 (g) | MCR-C61 (g) | DMS-C15 (g) |
|---|---|---|---|---|---|---|---|
| UPE | 38.20 | 15.60 | 45.20 | 51.50 |  |  |  |
| MUPE-1 | 36.72 | 15.60 | 45.20 | 51.50 | 1.50 |  |  |
| MUPE-2 | 35.20 | 15.60 | 45.20 | 51.50 | 3.00 |  |  |
| MUPE-5 | 30.70 | 15.60 | 45.20 | 51.50 | 7.50 |  |  |
| DUPE-2 | 35.20 | 15.60 | 45.20 | 51.50 |  |  | 3.00 |
| PUPE-1 | 36.72 | 15.60 | 45.20 | 51.50 |  | 1.50 |  |
| PUPE-2 | 35.20 | 15.60 | 45.20 | 51.50 |  | 3.00 |  |
| PUPE-5 | 30.70 | 15.60 | 45.20 | 51.50 |  | 7.50 |  |

The polyester resins prepared as described above were characterized for viscosity, molecular we and glass transition temperature. Viscosity measurements were made at 100° C. using an ICI cone and plate viscometer. Molecular weight was determined using Waters 2410 gel permeation chromatograph equipped with a refractive index detector. A 1% sample solution in tetrahydrofuran using a flow rate of 1 ml/min was used. Calibration was performed using polystyrene standards. Differential scanning calorimetry (DSC) measurements were conducted using a TA Instruments Q1000 series DSC. The testing method used was a heat-cool-heat cycle— from −170'C to 150° C. The second heating cycle was used to characterize the samples. $^1$H NMR measurements were done at 23° C. using a JOEL-ECA (400 MHz) NMR spectrometer with an autosampler accessory. All measurements were made in $CDCl_3$ as solvent. The data was processed using Delta software package.

The results of characterization of the unsaturated polyester resins using these criteria are described in Table 3. It was noticed that the $T_g$ of the control polyester was lower than the SUPEs. The viscosity of the novel unsaturated polyesters varied from 2.0-4.0 Poise at 100° C. The molecular weights determined using GPC were similar for all of the resins.

TABLE 3

Properties of the siloxane-functional unsaturated polyesters, SUPEs

| Sample Name | Viscosity Poise @ 100° C. | $M_n$ GPC | $T_g$ ° C. DSC |
|---|---|---|---|
| UPE* | 2 | 1900 | −39.30 |
| MUPE-1 | 2.4 | 2200 | −36.10 |
| MUPE-2 | 2 | 2000 | −36.00 |
| MUPE-5 | 2 | 2150 | −33.80 |
| PUPE-1 | 2.2 | 2300 | −36.30 |
| PUPE-2 | 2.4 | 1800 | −31.90 |
| PUPE-5 | 2.4 | 2045 | −34.30 |
| DUPE-2 | 3.9 | 2800 | −36.90 |

*Control

Figure 2:
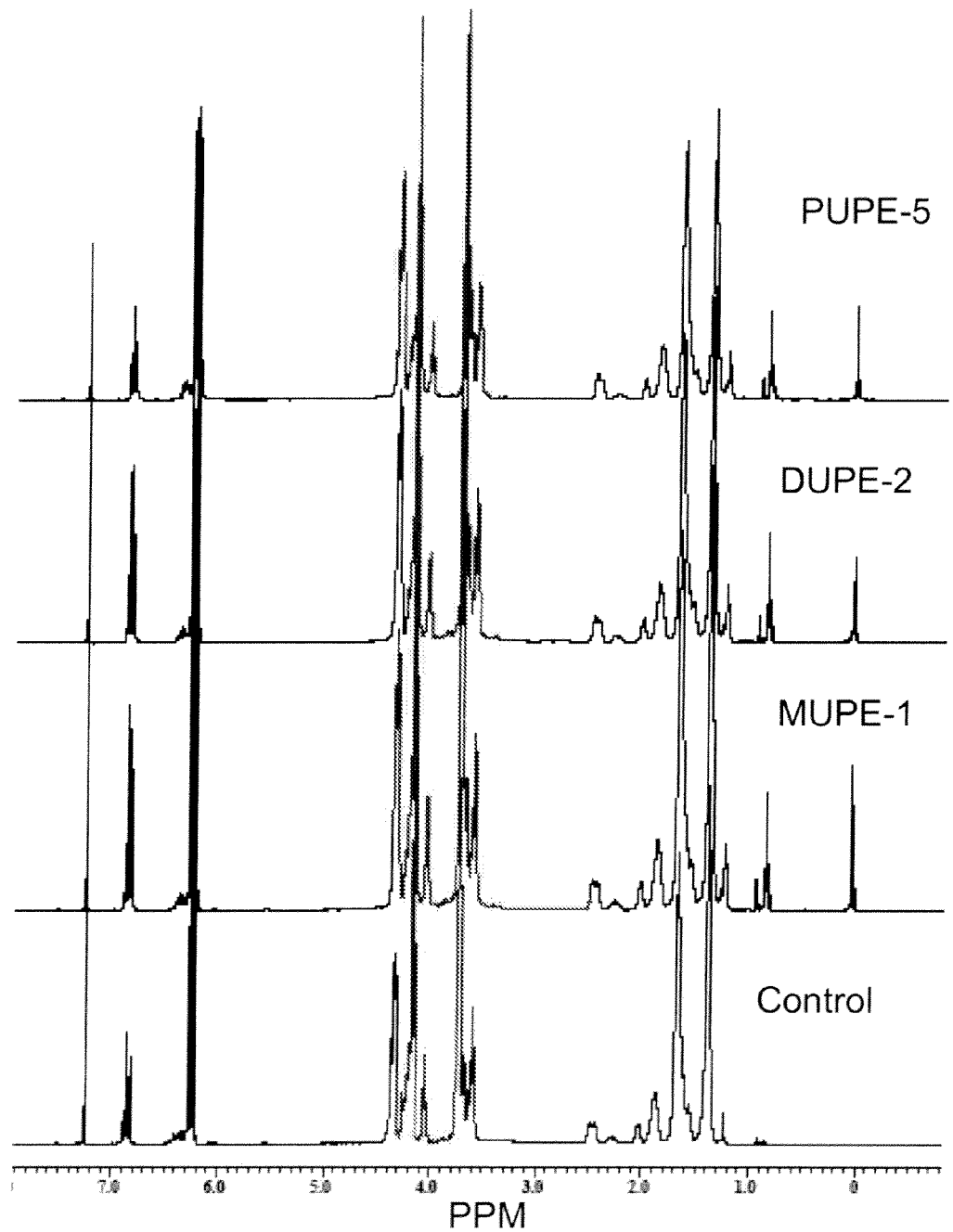
FIG. 2 depicts the $^1$H NMR spectra of the Control. MUPE-1, DUPE-2 and PUPE-5 resins.

These siloxane-functional unsaturated polyesters of the invention were also characterized by $^1$H NMR to confirm the presence of PDMS groups on the polymer backbone. FIG. 2 shows the $^1$H NMR overlay of the Control, MUPE-1, DUPE-2 and POPE-5. The SUPEs show peaks at 0.2 and 0.7-0.9 ppm which corresponds to the methyl protons on the PDMS backbone. These peaks are absent in the Control UPE spectrum and hence it can be confirmed that the PDMS functional groups in all cases were successfully attached on the polyester backbone.

Example 2

Preparation of Coating Formulations

Coating formulations were prepared by combining the SUPEs with four different vinyl ethers at the ratio of 1:1 of the reactive functional groups. TEGDVE, BDDVE and Vectomer 4010 have two vinyl ether groups per molecule whereas Vectomer 1312 is a polyester oligomer with an average of four vinyl ether groups per chain. The structures of the difunctional vinyl ethers used in this example are shown below. Six weight percent of the photoinitiator, Darocur 1173, based on the combined weight of resin and the reactive diluent was added to the formulation and was followed by mixing to obtain a homogeneous mixture. The coating formulations are set forth in Table 4.

TABLE 4

Coating formulations using SUPEs and vinyl ethers

| Sample Name | Polyester (g) | TEGDVE (g) | BDDVE (g) | Vectomer 4010 (g) | Vectomer 1312 (g) | Darocur 1173 (g) |
|---|---|---|---|---|---|---|
| 1 | UPE (2.73) | 1.01 | | | | 0.22 |
| 2 | UPE (2.73) | | 0.71 | | | 0.20 |
| 3 | UPE (2.73) | | | 1.81 | | 0.27 |
| 4 | UPE (1.36) | | | | 1.85 | 0.19 |
| 5 | MUPE-1 (2.86) | 1.01 | | | | 0.23 |
| 6 | MUPE-1 (2.86) | | 0.71 | | | 0.21 |
| 7 | MUPE-1 (2.86) | | | 1.81 | | 0.28 |
| 8 | MUPE-1 (1.43) | | | | 1.85 | 0.19 |
| 9 | MUPE-2 (2.86) | 1.01 | | | | 0.23 |
| 10 | MUPE-2 (2.86) | | 0.71 | | | 0.21 |
| 11 | MUPE-2 (2.86) | | | 1.81 | | 0.28 |
| 12 | MUPE-2 (2.86) | | | | 3.70 | 0.39 |
| 13 | MUPE-5 (3.07) | 1.01 | | | | 0.24 |
| 14 | MUPE-5 (3.07) | | 0.71 | | | 0.22 |
| 15 | MUPE-5 (3.07) | | | 1.81 | | 0.29 |
| 16 | MUPE-5 (3.07) | | | | 3.70 | 0.40 |
| 17 | DUPE-2 (3.07) | 1.01 | | | | 0.24 |
| 18 | DUPE-2 (3.07) | | 0.71 | | | 0.22 |
| 19 | DUPE-2 (3.07) | | | 1.81 | | 0.29 |
| 20 | DUPE-2 (3.07) | | | | 3.70 | 0.40 |
| 21 | PUPE-1 (2.86) | 1.01 | | | | 0.23 |
| 22 | PUPE-1 (2.86) | | 0.71 | | | 0.21 |
| 23 | PUPE-1 (2.86) | | | 1.81 | | 0.28 |
| 24 | PUPE-1 (1.43) | | | | 3.70 | 0.19 |
| 25 | PUPE-2 (3.07) | 1.01 | | | | 0.24 |
| 26 | PUPE-2 (3.07) | | 0.71 | | | 0.22 |
| 27 | PUPE-2 (3.07) | | | 1.81 | | 0.29 |
| 28 | PUPE-2 (3.07) | | | | 3.700 | 0.40 |
| 29 | PUPE-5 (3.07) | 1.01 | | | | 0.24 |
| 30 | PUPE-5 (3.07) | | 0.71 | | | 0.22 |
| 31 | PUPE-5 (3.07) | | | 1.81 | | 0.29 |
| 32 | PUPE-5 (3.07) | | | | 3.70 | 0.40 |

Structures of Difunctional Vinyl Ethers Used.

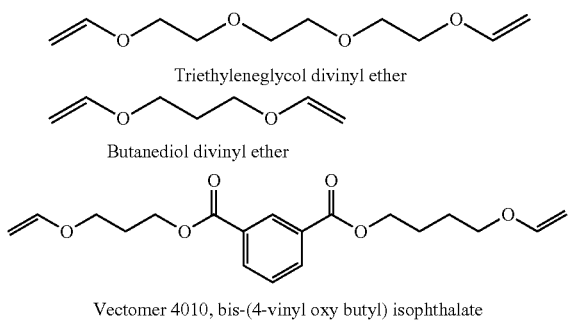

Triethyleneglycol divinyl ether

Butanediol divinyl ether

Vectomer 4010, bis-(4-vinyl oxy butyl) isophthalate

Coating formulations were deposited onto a substrate using a drawdown bar with a 4 mil gap. Aluminum substrate was used for contact angle and hardness measurements and glass was used to obtain free films for DSC and other tests. The samples were cured under UV light until the films were non-tacky to touch (~4 min). A Dymax 200 EC silver lamp (UV-A, 365 nm) with an intensity of 35 mW/cm² (measured with an International Light digital radiometer (Model IL 1400A)) was used as the source for UV radiation, Testing of film samples was performed 24 hours after curing.

Example 3

Coating Characterization

Real time FTIR measurements were made using a Nicolet Magna FTIR spectrometer. A LESCO Super Spot MK II UV curing lamp equipped with a fiber optic light guide was the source of UV irradiation of samples. Uncured sample was spin-coated at an rpm of 3000 for 30 seconds onto a KBR disk and was simultaneously exposed to IR and UV irradiation. The sample as placed at a distance of 20 mm from the end of the fiber optic cable. Light intensity at the sample was 50 mW/cm². In all cases, ER data collection was continued after UV irradiation was stopped.

Figure 3:
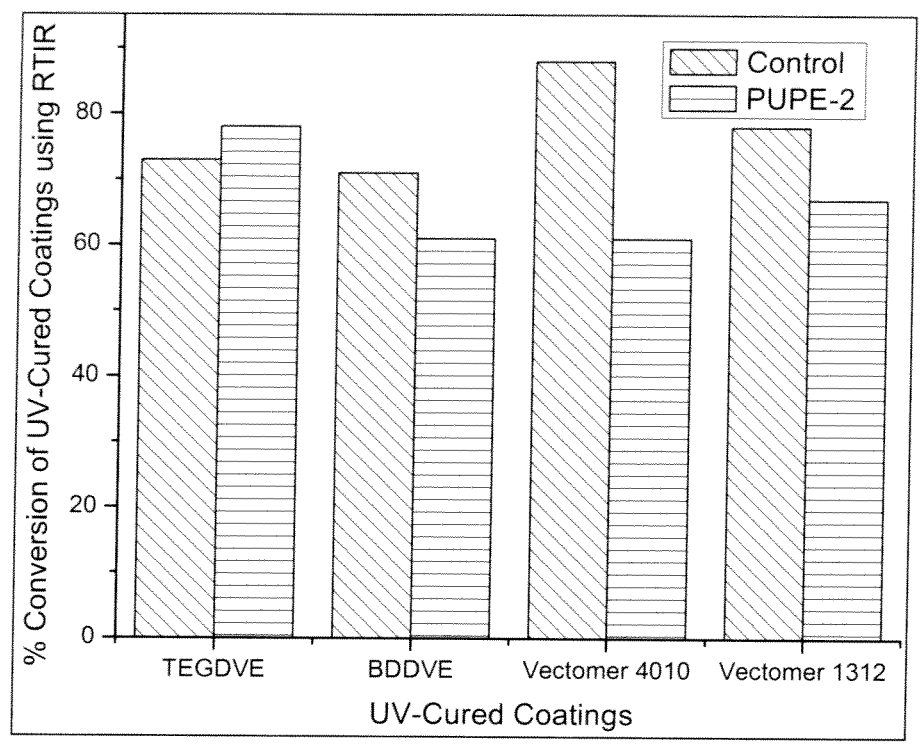
FIG. 3 depicts the percent conversion of PUPE-2 and control coating as a function of the reactive diluents.

RTIR was used to study the disappearance of the vinyl ether peak at 1639 cm$^{-1}$ and utilizing the same to monitor the extent of reaction as a function of time. Since the donor-acceptor polymerizations are stoichiometric, the conversion of vinyl ether groups also indicates the conversion of maleate groups. In order to study the effect of composition on the extent of cure, samples were subjected to a 90 sec UV light exposure. The degree of conversion was calculated using Equation 1:

$$\% \text{ conversion} = \{[(A_{1639})_0 - (A_{1639})_t]/(A_{1639})_0\} \times 100 \qquad \text{Equation 1}$$

where $(A_{1639})_0$ is the absorbance at time=0. RTIR studies were conducted to study the effect of reactive diluents, the effect of percent loading of PDMS and the effect of PDMS structure on the extent of UV-curing reaction. FIG. 3 shows the extent of reaction for the novel coatings as a function of reactive diluents for PUPE-2. It was observed that the polyesters with PDMS groups had significantly lower percent conversion than the control coatings when crosslinked with all reactive diluents in the present study except for TEGDVE. One of the possible reasons for this is that the presence of PDMS at the air-surface interface can promote higher oxygen penetration and hence can inhibit the free-radical photopolymerization reactions. It is known that PDMS is a poor oxygen barrier [P. Kurian; B. Kasibhatla; J. Daum; C. A. Burns; M.

Moosa; K. S. Rosenthal; J. P. Kennedy. "Synthesis, permeability and biocompatibility of tricomponent membranes containing polyethylene glycol, polydimethylsiloxane and polypentamethylcyclopentasiloxane domains." *Biomaterials* 2003, 24, 3493-3503]. It was also noticed that the SUPEs when crosslinked with TEGDVE, had lower percent conversions than the control coating.

Figure 4:
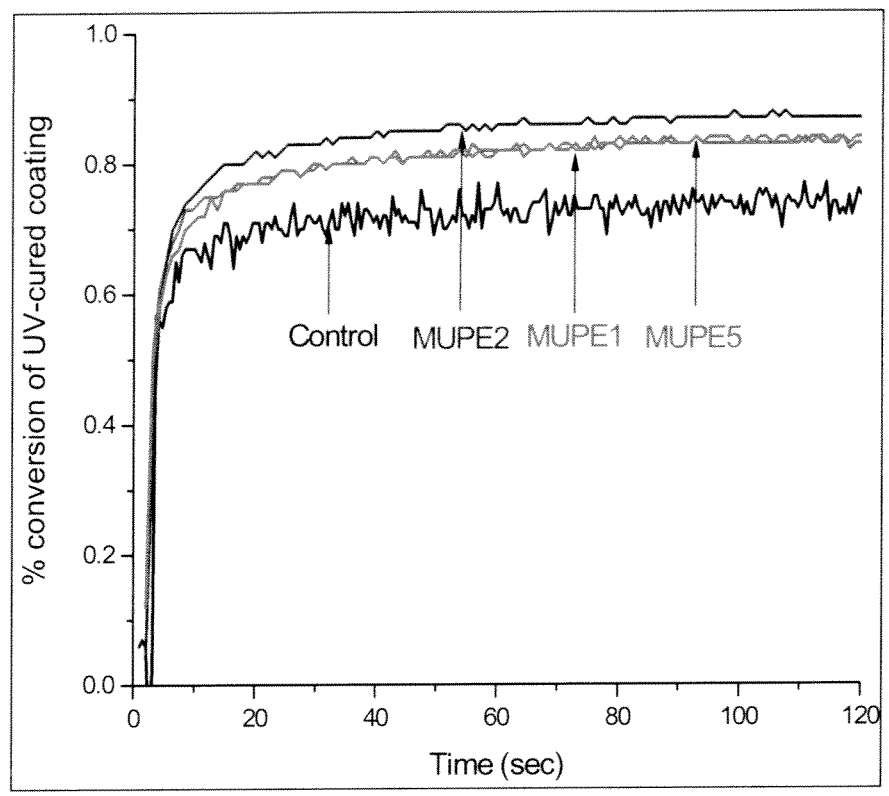
FIG. 4 depicts the RTIR conversions of vinyl ether bonds for MUPEs crosslinked with TEGDVE.

The extent of the reaction as a function of percent loading of PDMS for the MUPE series of polyesters crosslinked with TEGDVE showed that the control coating had lower percent conversion of the functional groups than the siliconized coatings. The formulation having 2 weight percent monohydroxyl functional PDMS had slightly higher coating that the 1 and 5 the percent, which had almost identical percent conversion. FIG. 4 shows the plot for percent conversion of MUPE series of polyesters crosslinked with TEGDVE.

Figure 5:
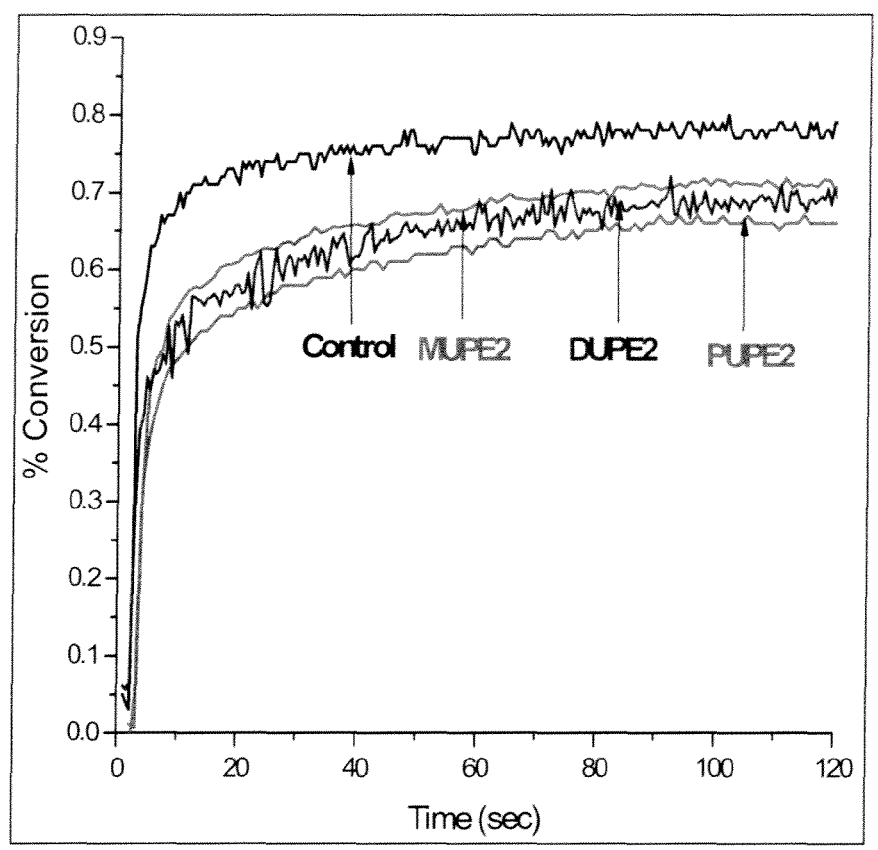
FIG. 5 depicts percent conversion of vinyl ether bonds as a function of PDMS structure for coatings crosslinked with Vectomer 1312.

Conversion of the functional groups as a function of PDMS structure on the polyester backbone was also studied. FIG. 5 shows a plot for DUPE-2. MUPE-2, PUPE-2 and the control coating crosslinked with Vectomer 1312 crosslinker. As expected, the control coating has higher percent conversion of the vinyl ether bonds than the SUPEs. Although there was no significant difference in the percent conversion of the functional groups with varying PDMS structure, MUPE-2 based coating has the highest conversion, whereas PUPE-2 functional coating had the lowest.

Figure 6:
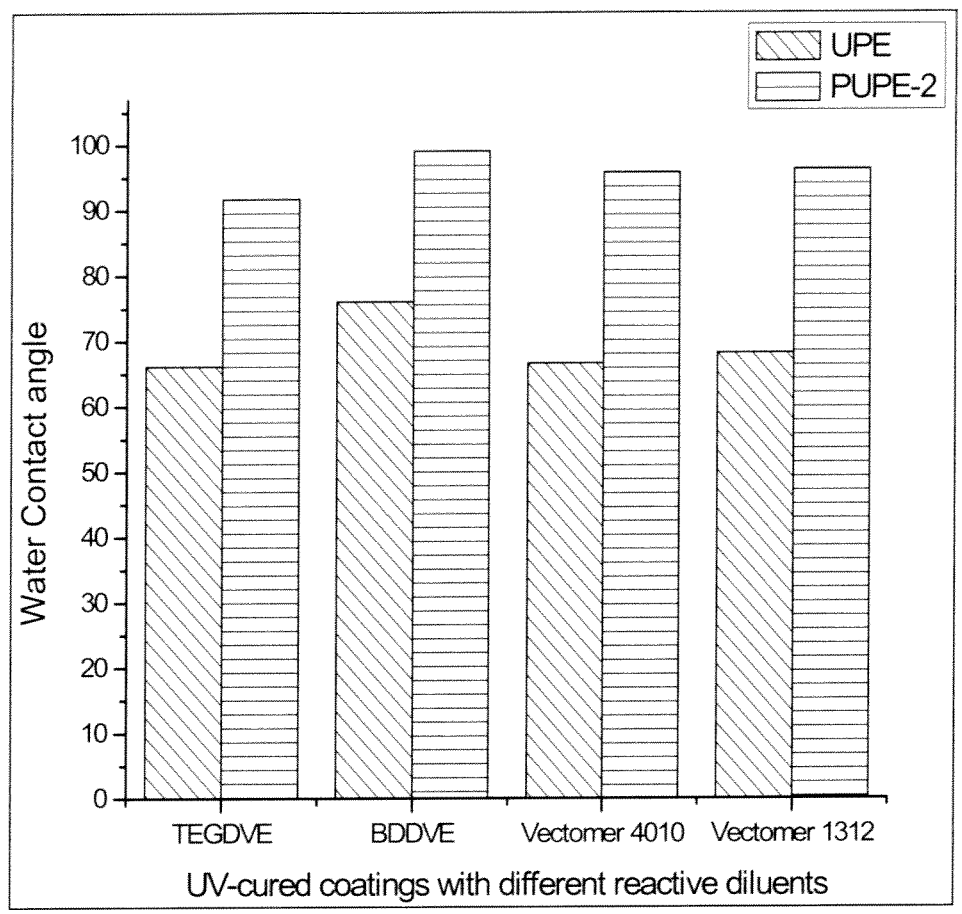
FIG. 6 depicts the water contact angle of PUPE-2 and control coatings crosslinked with different reactive diluents.

The hydrophobicity of the PDMS functional coatings were determined by water contact angle. It was observed that all coatings with PDMS groups on the polyester backbone were hydrophobic irrespective of the reactive diluent used. FIG. 6 shows the water contact angle values as a function of the reactive diluents for PUPE-2 and control polyesters. The contact angles for the control coatings are in the range of 65-70 degrees whereas the PUPE-2 based coatings have contact angle higher than 90 degrees (FIG. 6). This indicates the presence of PDMS groups on the coatings surface.

Figure 7:
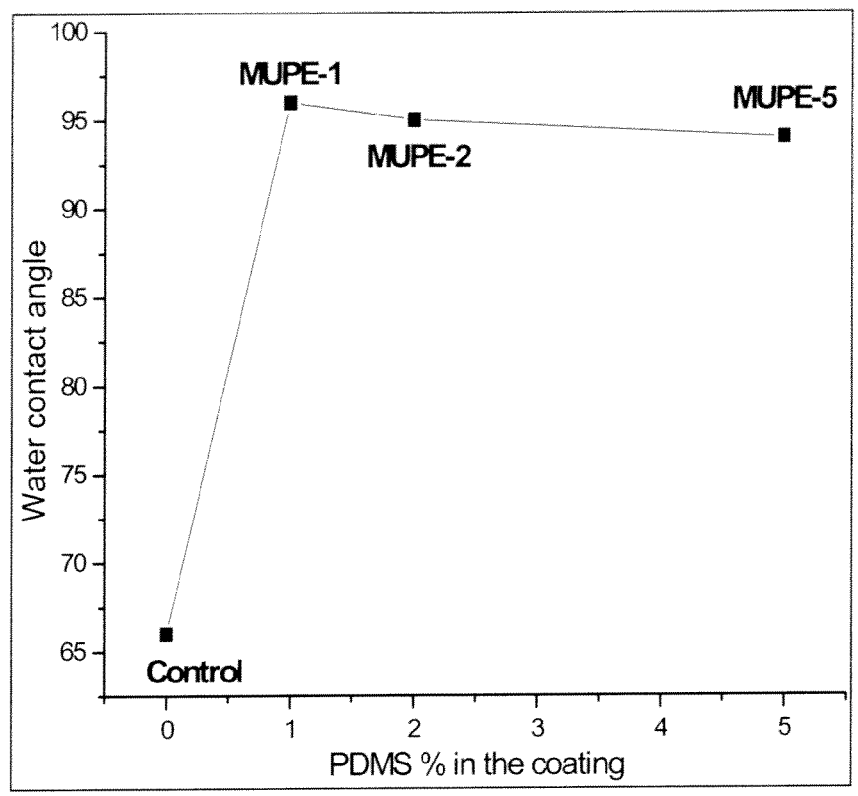
FIG. 7 depicts the water contact angle of MUPE series of the coatings crosslinked with Vectomer 4010.

The effect of percent loading of PDMS on the water contact angle was also studied. The MUPE series of the polyesters were crosslinked with Vectomer 4010 and it was observed that all the coatings were hydrophobic regardless of the amount of the percent loading. Moreover, no significant change in the water contact angle was observed between one and five weight percent of the PDMS on the polyester backbone. FIG. 7 shows the graph for water contact angle of the MUPE series of the unsaturated polyesters crosslinked with Vectomer 4010 reactive diluent.

Thermal stability of the siliconized and the control coatings were compared for the weight loss using TGA. Thermogravimetric analysis (TGA) was performed using a TA Instruments Q500 in air from ambient temperature to 700° C. at a ramp rate of 10° C./min.

Figure 8:
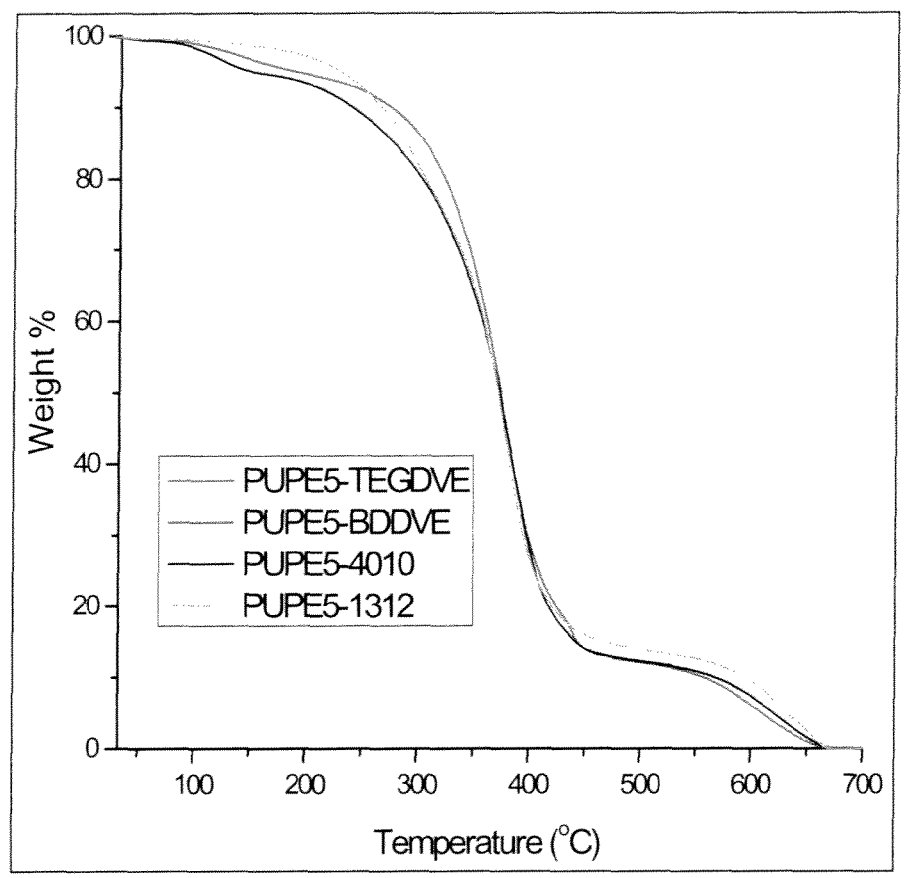
FIG. 8 depicts the TGA curves for PUPE-5 crosslinked with different vinyl ethers.

The weight loss at 150'C was less than 5% which may be attributed to moisture loss or a volatilization of low molecular weight, unreacted components in the crosslinked film. The coatings were characterized as a function of reactive diluents and also for the effect of PDMS structure on the polyester backbone. TGA curve for the PUPE-5 polyester crosslinked with various reactive diluents is shown in FIG. 8. It can be seen from the figure that the reactive diluents did not have a significant effect on the thermal stability of the siliconized coatings. The TGA curves for the crosslinked coatings are similar to what is reported in the literature for UPE-vinyl ether based systems [N. Ravindran; A. Vora; D. C. Webster. "Effect of polymer composition on performance properties of maleate-vinyl ether donor-acceptor UV-curable systems." *JCT Research* 2006, 3, 213-219].

Figure 9:
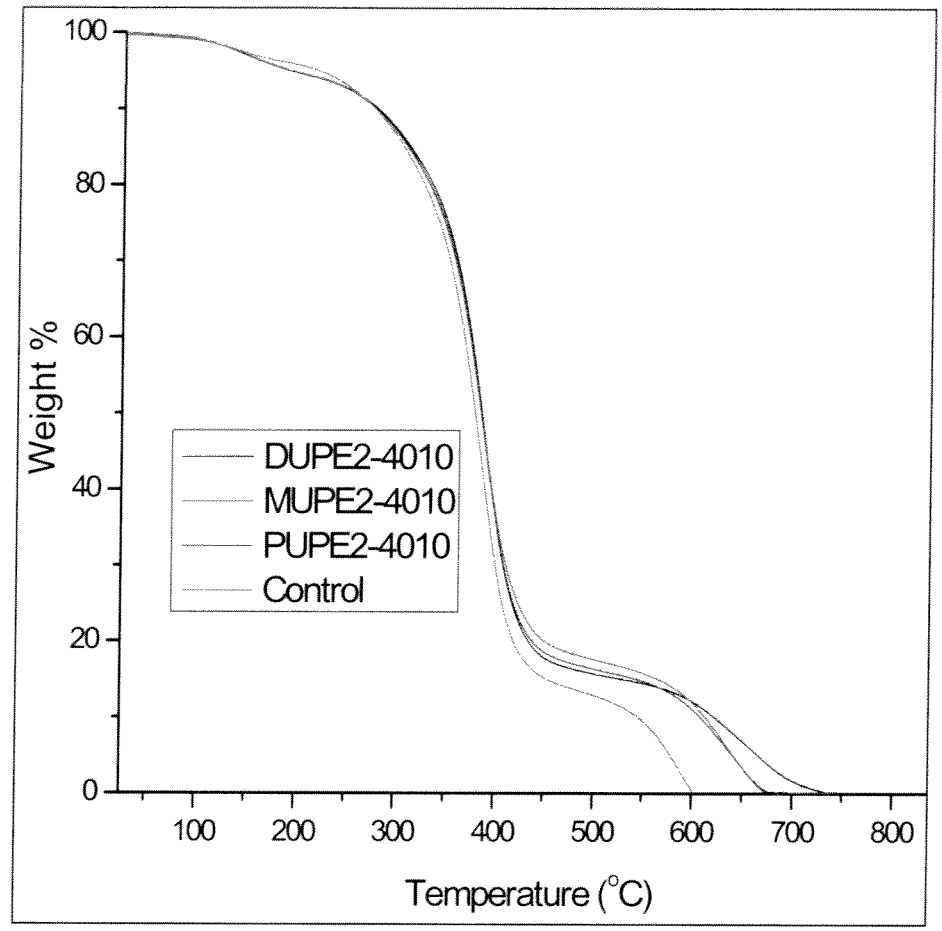
FIG. 9 depicts the TGA curves for the coatings crosslinked with Vectomer 4010.

The TGA curves for the SUPEs with different PDMS backbone when crosslinked with Vectomer 4010 showed an enhanced thermal stability in the high temperature regions than the control coating. PDMS coatings are known to give higher char yield due to the presence of Si—O—Si bonds on the polymer backbone [N. Kayaman-Apohan; A. Amanoel; N. Arsu; A. Güngör. "Synthesis and characterization of UV-curable vinyl ether functionalized urethane oligomers." *Progress in Organic Coatings* 2004, 49, 23-321. FIG. 9 shows the TGA curves for the DUPE-2, MUPE-2, PUPE-2 and the control coatings crosslinked with Vectomer 4010. It can be seen from the curve that the control coating chars at ~600° C., whereas the PDMS functional coatings char between 675-750° C.

The glass transition ($T_g$) temperature of the coatings was determined using a TA Instruments Q 800 dynamic mechanical analyzer (DMA). The dimensions of free films used were 20 to 23 mm of length, 5 mm of width and 0.09 to 0.1 mm of thickness. Poisson's ratio was assumed to be 0.4 for all of the films. The experiments were carried out from −120° C. to 150° C. increasing at 5° C./min at a frequency of 1 Hz.

The glass transition values obtained are in Table 5. The glass transition temperatures of the coatings were found to vary as a function of reactive diluents and the PDMS content in the polyester backbone. It was observed all the siloxane-functional coatings crosslinked with Vectomer 1312 reactive diluent had the lowest $T_g$s. The $T_g$s for these coatings ranged from −10 to −20° C., whereas the control polyester crosslinked with Vectomer 1312 had a $T_g$ of 60° C. This trend was observed for all the coatings irrespective of the type of PDMS group incorporated on the polyester backbone. The control and the siliconized coatings crosslinked with Vectomer 4010 did not show any significant change in the T, values as seen for the Vectomer 1312 series of the coatings. Most coatings formulated using TEDGVE and BDDVE as the crosslinker were too brittle to obtain the free films for DMA measurements.

TABLE 5

Glass transition temperature of coatings by dynamic mechanical analysis.

| Polyester | Vinyl Ether | Tg (° C.) |
|---|---|---|
| DUPE-2 | Vectomer 1312 | −18 |
| DUPE-2 | TEGDVE | 71 |
| MUPE-1 | Vectomer 4010 | 98 |
| MUPE-2 | Vectomer 4010 | 75 |
| MUPE-2 | Vectomer 1312 | −16 |
| MUPE-5 | Vectomer 4010 | 95 |
| PUPE-1 | Vectomer 1312 | −20 |
| PUPE-2 | Vectomer 1312 | −12 |
| PUPE-5 | Vectomer 1312 | −10 |
| Control | Vectomer 4010 | 88 |
| Control | Vectomer 1312 | 60 |

Example 4

Blending Experiments

Figure 10:
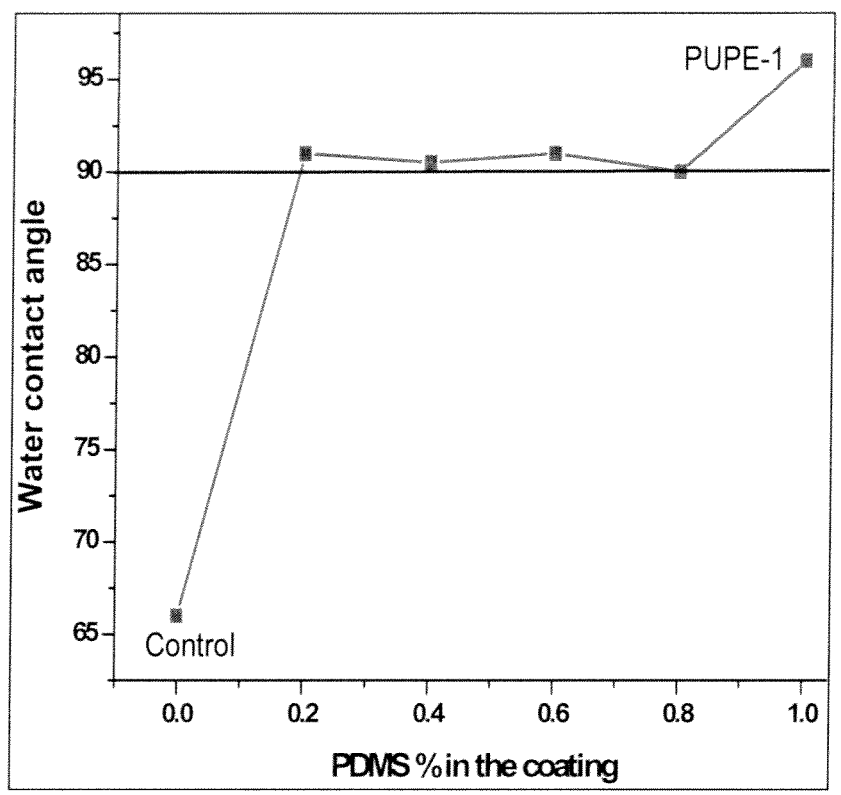
FIG. 10 depicts the water contact angle of the coatings formulated by blending the control and PUPE-1.

To further evaluate the effectiveness of the SUPE based coatings to obtain hydrophobic surfaces, a blending study of the control polyester (UPE) and PUPE-1 at four different ratios were also studied. In this experiment, the PUPE-1 and the control polyesters were blended such that the effective amount of PDMS in the formulations was 0.2, 0.4, 0.6 and 0.8 weight percent (Table 6). The blended mixture was crosslinked with TEGDVE in the presence of 6 wt % Darocur 1173 as the photoinitiator. It was observed that coatings containing as low as 0.2 weight percent PDMS had a water contact angle of 90°. These results indicate that the PDMS component of the coating which has very low surface enemy predominates at the air-substrate interface even at very low amounts of incorporation (FIG. 10). Furthermore, it was observed that the coatings obtained by blending the polyesters did not peel off from the aluminum substrate after 2-3 weeks unlike other SUPE based coatings formulated without blending. These results show that stable hydrophobic surfaces can be achieved by incorporating additive amounts of the PDMS functional group on the polymer backbone

TABLE 6

Blending of the PUPE-1 and control polyesters

| PDMS % | Control (g) | PUPE1 (g) | Vectomer 4010 (g) | Darocur 1173 (g) |
|---|---|---|---|---|
| 0 | 2.73 | — | 1.81 | 0.27 |
| 0.2 | 2.16 | 0.54 | 1.81 | 0.27 |
| 0.4 | 1.62 | 1.08 | 1.81 | 0.27 |
| 0.6 | 1.04 | 1.62 | 1.81 | 0.27 |
| 0.8 | 0.54 | 2.16 | 1.81 | 0.27 |
| 1.0 | — | 2.86 | 1.81 | 0.27 |

The claimed invention is:

1. An unsaturated polyester prepared from the polycondensation of unsaturated diacid monomers or unsaturated diacid anhydride monomers selected from maleic acid, maleic acid anhydride, fumaric acid, itaconic acid, or mixtures thereof, and polyol monomers selected from ethylene glycol, 1,2-propanediol, 1,3-propanediol, 2-methyl-1,3-propanediol, 2,2,-dimethyl-1,3-propanediol (neopentyl glycol), 1,4-butanediol, 1,5-pentanediol, 1,6-hexanediol, 2,2,4-trimethyl-1,3-pentanediol, 2-butyl,2-ethyl-1,3-propanediol, diethylene glycol, triethylene glycol, dipropylene glycol, 1,4-cyclohexanedimethanol, 1,3-cyclohexanedimethanol, glycerol, trimethylolpropane, trimethylol ethane, or mixtures thereof, and, optionally, one or more saturated aliphatic or aromatic diacid monomers or anhydride monomers thereof, the improvement comprising:

0.5 to 5 weight percent, based on the total monomer weight, of an hydroxyalkyl-functional siloxane of formula (1):

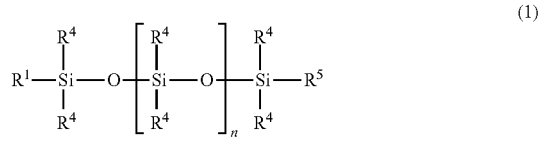

wherein
$R^1$ is the group $R^2C(R^3)_2CH_2$—O—$(CH_2)_m$— where $R^2$ is OH, $CH_3$, or $CH_2CH_3$ and $R^3$ is H or $CH_2OH$, provided that at least one of $R^2$ and $R^3$ contains a hydroxyl (OH) moiety; and m ranges from 0 to 4;
$R^4$ is a $C_1$-$C_3$ alkyl;
$R^5$ is $R^1$ or a $C_1$-$C_5$ alkyl; and
n ranges from 0 to 700.

2. An unsaturated polyester of claim 1, further comprising one or more saturated aliphatic or aromatic diacid monomers or anhydride monomers thereof selected from the group of adipic acid, azelaic acid, phthalic anhydride, phthalic acid, isophthalic acid, terephthalic acid, hexahydrophthalic anhydride, tetrahydrophthalic anhydride, 1,4-cyclohexane dicarboxylic acid, 1,3-cyclohexane dicarboxylic acid, or mixtures thereof.

3. An unsaturated polyester resin of claim 1, wherein:
in formula (1), $R^4$ is methyl;
the unsaturated diacid monomers or the unsaturated diacid anhydride monomers are selected from maleic acid and maleic acid anhydride;
the polyols are selected from diethylene glycol, 1,6-hexanediol, or mixtures thereof; and
the one or more saturated aliphatic or aromatic diacid monomers or anhydride monomers thereof is 1,4-cyclohexanedicarboxylic acid.

4. An unsaturated polyester resin of claim 1, wherein the hydroxyalkyl functional siloxane of formula (1) is

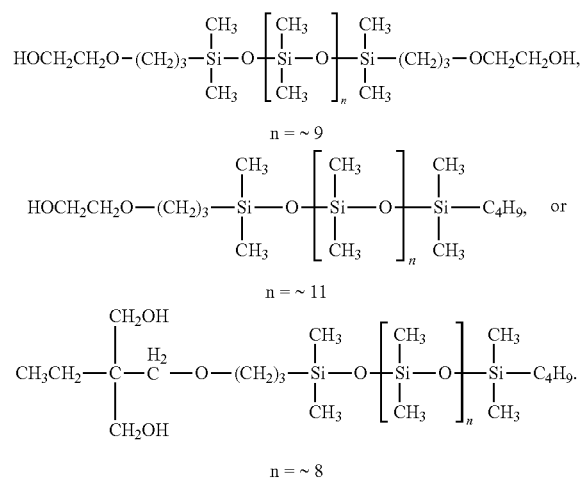

5. A UV curable coating formulation comprising:
an unsaturated polyester resin of claim 1;
a vinyl ether functional diluent present an amount such that the stoichiometric ratio between the vinyl groups in the vinyl ether functional diluents and unsaturated groups on the unsaturated polyester is not more than 1:1; and
a photoinitiator in the amount of 0.1 to 10 weight percent.

6. A UV curable coating formulation of claim 5, wherein:
for the unsaturated polyester:
the optional one or more saturated aliphatic or aromatic diacid monomers or anhydride monomers thereof selected from the group of adipic acid, azelaic acid, phthalic anhydride, phthalic acid, isophthalic acid, terephthalic acid, hexahydrophtalic anhydride, tetrahydrophthalic anhydride, 1,4-cyclohexane dicarboxylic acid, 1,3-cyclohexane dicarboxylic acid, or mixtures thereof; and
the vinyl ether functional diluent is selected from ethylene glycol divinyl ether, propanediol divinyl ether, butanediol divinyl ether, diethylene glycol divinyl ether, triethylene glycol divinyl ether, 1,4-cyclohexanedimethanol divinyl ether, or mixtures thereof.

7. A UV curable coating formulation of claim 6, wherein:
in formula (1), $R^4$ is methyl;
the unsaturated diacid monomers or the unsaturated diacid anhydride monomers are selected from maleic acid and maleic acid anhydride;
the polyols are selected from diethylene glycol, 1,6-hexanediol, or mixtures thereof;

the one or more saturated aliphatic or aromatic diacid monomers or anhydride monomers thereof is 1,4-cyclohexanedicarboxylic acid; and the vinyl ether functional diluent is selected from butanediol divinyl ether, triethylene glycol divinyl ether, or mixtures thereof.

8. A UV curable coating formulation of claim 6, wherein the hydroxyalkyl functional siloxane of formula (1) is

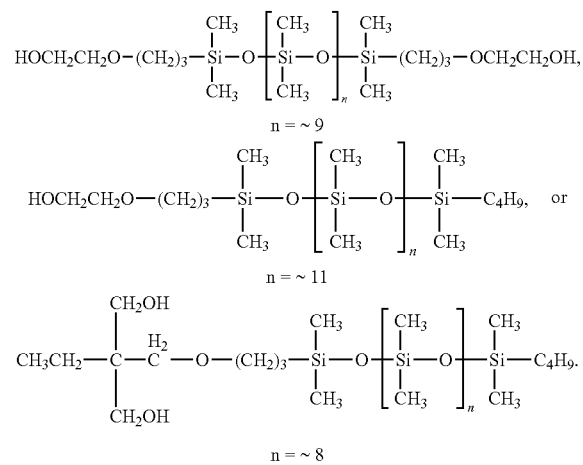

9. A method of preparing an article with a low-surface energy coating comprising the steps of:
coating at least one surface of an article with a coating formulation of claim 5; and
curing the coating with UV light to form a low-surface energy coating on the surface.

10. A method of claim 9, wherein the surface is a paper surface, a wood surface, a plastic surface, a metal surface, a glass surface, or a ceramic surface.

11. An article having a low surface area coating comprising at least one UV-cured layer of the coating formulation of claim 5 on at least one surface of the article.

12. An unsaturated polyester prepared from the polycondensation of unsaturated diacid monomers or unsaturated diacid anhydride monomers, and polyol monomers, and 1,4-cyclohexane dicarboxylic acid, the improvement comprising:
0.5 to 50 weight percent, based on the total monomer weight, of an hydroxyalkyl-functional siloxane of formula (1):

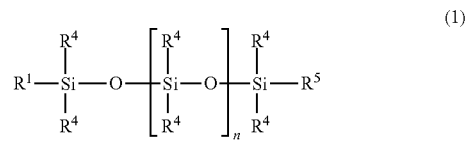

wherein
$R^1$ is the group $R^2C(R^3)_2CH_2\text{—}O\text{—}(CH_2)_m\text{—}$ where $R^2$ is OH, $CH_3$, or $CH_2CH_3$, and $R^3$ is H or $CH_2OH$, provided that at least one of $R^2$ and $R^3$ contains a hydroxyl (OH) moiety; and m ranges from 0 to 4;
$R^4$ is a C1-C3 alkyl;
$R^5$ is R1 or a C1-C5 alkyl; and
n ranges from 0 to 700.

13. An unsaturated polyester of claim 12, further comprising one or more saturated aliphatic or aromatic diacid monomers or anhydride monomers thereof selected from the group of adipic acid, azelaic acid, phthalic anhydride, phthalic acid, isophthalic acid, terephthalic acid, hexahydrophtalic anhydride, tetrahydrophthalic anhydride, 1,3-cyclohexane dicarboxylic acid, or mixtures thereof.

14. An unsaturated polyester resin of claim 12, wherein the hydroxyalkyl functional siloxane is present in an amount of 0.5 to 5 weight percent, based on the total monomer weight.

15. An unsaturated polyester resin of claim 12, wherein the hydroxyalkyl functional siloxane of formula (1) is

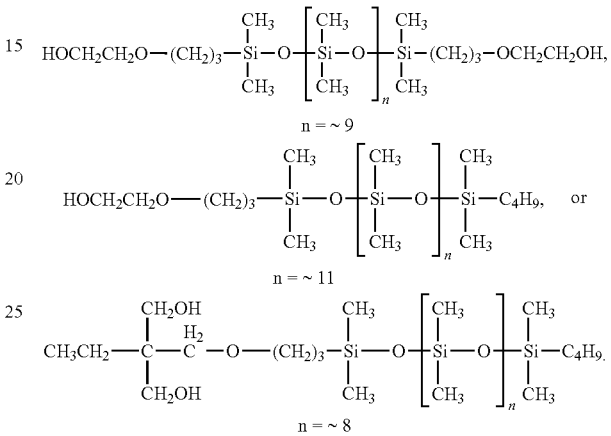

16. A UV curable coating formulation comprising:
an unsaturated polyester resin of claim 12;
a vinyl ether functional diluent present an amount such that the stoichiometric ratio between the vinyl groups in the vinyl ether functional diluents and the unsaturated groups on the unsaturated polyester is not more than 1:1; and
a photoinitiator in the amount of 0.1 to 10 weight percent.

17. A UV curable coating formulation of claim 16, wherein the vinyl ether functional diluent is selected from ethylene glycol divinyl ether, propanediol divinyl ether, butanediol divinyl ether, diethylene glycol divinyl ether, triethylene glycol divinyl ether, 1,4-cyclohexanedimethanol divinyl ether, or mixtures thereof.

18. A UV curable coating formulation of claim 17, wherein the hydroxyalkyl functional siloxane is present in an amount of 0.5 to 5 weight percent, based on the total monomer weight.

19. A UV curable coating formulation of claim 17, wherein the hydroxyalkyl functional siloxane of formula (1) is

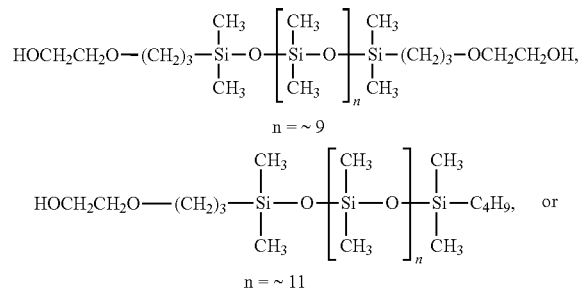

-continued

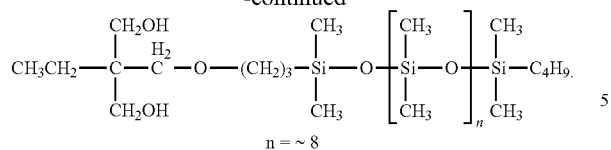

n = ~ 8

20. A method of preparing an article with a low-surface energy coating comprising the steps of:
coating at least one surface of an article with a coating formulation of claim 16; and
curing the coating with UV light to form a low-surface energy coating on the surface.

21. An article having a low surface area coating comprising at least one UV-cured layer of the coating formulation of claim 16 on at least one surface of the article.

22. An unsaturated polyester of claim 12, wherein:
the unsaturated diacid monomers or the unsaturated diacid anhydride monomers are selected from maleic acid, maleic acid anhydride, fumaric acid, itaconic acid, or mixtures thereof; and
the polyols are selected from ethylene glycol, 1,2-propanediol, 1,3-propanediol, 2-methyl-1,3-propanediol, 2,2-dimethyl-1,3-propanediol (neopentyl glycol), 1,4-butanediol, 1,5-pentanediol, 1,6-hexanediol, 2,2,4-trimethyl-1,3-pentanediol, 2-butyl-2-ethyl-1,3-propanediol, diethylene glycol, triethylene glycol, dipropylene glycol, 1,4-cyclohexanedimethanol, 1,3-cyclohexanedimethanol, glycerol, trimethylolpropane, trimethylolethane, or mixtures thereof.

* * * * *